Patented Apr. 16, 1946

2,398,347

UNITED STATES PATENT OFFICE 2,398,347

MATERIAL FOR SEALING OFF POROUS FORMATIONS IN WELLS

Francis M. Anderson, Duncan, Okla., assignor to Halliburton Oil Well Cementing Company, Duncan, Okla.

No Drawing. Application June 17, 1944, Serial No. 540,879

2 Claims. (Cl. 252—8.5)

This invention relates to materials for sealing off porous formations in wells and more particularly to improved materials for use in drilling oil or gas wells through porous strata.

In the rotary system of drilling oil wells a mud fluid is circulated down through the drill pipe and up through the well bore. The mud fluid contains solids in liquid suspension, some of which function to form a filter cake or plaster in crevices or along the wall of the porous strata encountered while drilling. Various materials such as vegetable fibers, ground hemp, cotton seed hulls, shredded paper, paper pulp, chopped Cellophane, shredded redwood bark, ground sugar cane fibers, and so on, have heretofore been proposed for assisting the formation of a suitable filter cake, particularly where fissures or crevices occur in the earth strata which are of such character that the mud will penetrate the strata with the result that circulation is lost.

Likewise, in the cementing of oil wells, it sometimes happens that the cement slurry pumped into the well to seal off a porous formation, encounters a fissure or crevice and leaves the bore hole without sealing off the porous formation or accomplishing any useful result. Materials such as those mentioned above have commonly been used with cement as well as mud to retard the flow of the slurry until it hardens.

The various materials heretofore proposed for use with mud or with cement slurry to prevent the flow thereof off into the formations have been of value, but have not always brought about the desired result. When used with mud some have not had sufficient strength to impede the flow when the mud is subjected to hydrostatic pressure. Other materials have seemed actually to prevent the proper formation of a filter cake along the wall of the bore hole through a porous stratum. Similarly, when used with cement some of the materials have reduced the strength of the cement when set because the fibrous material remaining admixed therewith is of low tensile or shear strength, and other materials, particularly sugar cane fibers, have reacted chemically with the cement to prevent it setting properly, or in some cases, from setting at all.

It is an object of the present invention to devise an improved drilling mud or an improved cement slurry in which the disadvantages mentioned above are overcome and in which the flow of mud or slurry can be prevented from flowing through crevices or fissures in the earth much more effectively than has heretofore been the case.

Other objects and advantages reside in certain novel features of the materials used, as will be apparent from the following description.

It has been discovered that by properly preparing certain types of feathers, a material may be provided which will accomplish the objects of the invention when used either with drilling mud or with cement slurry. For example, chicken feathers may be prepared by first dequilling or stemming them and then causing them to be shredded, broken and crushed. It is preferable then to remove the finer particles of the resultant mass by screening or dusting and if desired, the product so obtained may be expanded or fluffed by needling.

The comminuted or felted material manufactured as indicated above, has been found to produce excellent results when mixed with drilling mud in the following proportions by weight:

| | Per cent |
|---|---|
| Water | 75.0 |
| Barytes | 21.0 |
| Bentonite | 3.5 |
| Feathers | 0.5 |

It will be apparent to those skilled in the art that the proportions may be varied considerably and that materials covered by this invention may be advantageously employed in various types of muds, for example, with other clays than bentonite and with other weighting material than barytes. In general, where mixed with mud or with cement slurry, the most desirable proportion of feathers appears to be between 0.25 and 1.00 per cent by weight, and this proportion may be said to constitute the preferred range of the invention.

It will be observed that but a very small amount of the comminuted feathers are used in the above example. It is desirable to use but a small amount of fibrous material in mud since any amount used interferes with the normal functioning of the mud in circulating cuttings from the drill hole, lubricating, etc. An outstanding advantage of the present invention resides in the fact that but a small amount of material is effective to prevent loss of fluid into the formations. Comparative tests with materials now commonly in use for the same purpose were performed in the laboratory, as follows:

A drilling mud was prepared with bentonite, barytes and water, having a weight of about 10 pounds per gallon and a viscosity of about 15 centipoises. An apparatus was prepared for estimating the amount of mud loss in fissures or crevices in earth formations. This consisted of an arrangement for making a gravel chamber with means for subjecting crushed stone in the chamber to the mud under pressure. A section of pipe 6½ inches in diameter was provided with a perforated plate in the bottom. The pipe was then filled with one-half inch graded crushed stone to a height of 12 inches and provision was made for supplying mud to the top of the pipe. The gravel chamber thus provided was mounted in a vertical position and the mud which passed through the gravel was caught and weighed for each test. The mud was forced into the gravel chamber under pressure, the pressure being maintained until a complete shut off of liquid through the gravel chamber was obtained and the pump pressure rose to 2,500 pounds per square inch. The following table shows the amount of mud, with various loss preventing admixes added, which passed through the gravel chamber in pounds of mud per square foot of exposed gravel before shut off was effected. In each case one-half of one per cent by weight of admix was added to the mud.

*Mud*

| Admix | Loss |
|---|---|
| | Lbs./sq. ft. |
| Sugar cane fibers | 192 |
| Ground cotton seed hulls | 188 |
| Shredded redwood bark | 232 |
| Comminuted feathers | 84 |

It is to be understood that the tests run with such a gravel chamber do not indicate the actual loss of mud which would be encountered in an oil well. The amount of mud loss in the well will depend upon the conditions of the well. The above tests merely serve to give comparative data on the merits of the various materials tested.

For use with cement, comminuted feathers possess particular advantages. An ideal material for preventing slurry loss in formations would be one which would temporarily plug crevices or fissures but which would not interfere in any way with the strength of the cement when set or with the bond between the cement and the walls of the bore hole after the cement is set. Feathers have these advantages. It has been discovered that ordinary Portland cement has sufficient alkalinity to gradually dissolve feathers. The result is that the cement as it hardens dissolves the feathers which remain in the slurry and presumably a portion of those which are plastered against the wall of the hole as squeeze pressure is applied on the slurry. The hardened cement is thus homogeneous and of much greater strength than would be the case if cleavage planes occurred due to the filtering or separating action which is supposed normally to occur where ordinary vegetable fibers or the like are employed to prevent slurry loss.

As in the case of mud, the per cent of comminuted feathers admixed with the slurry may be varied but an excellent mixture has been provided by adding one-half of one per cent by weight of comminuted feathers to a Portland cement slurry weighing 15.3 pounds per gallon. Tests run with this material following the procedure outlined above in connection with a gravel chamber, gave the following results:

*Cement*

| Admix | Loss |
|---|---|
| | Lbs./sq. ft. |
| Sugar cane fibers | 33 |
| Ground cotton seed hulls | 15 |
| Shredded redwood bark | 13 |
| Comminuted feathers | 2 |

In adding comminuted feathers to drilling mud or to cement slurry, best results can be obtained by thorough mixing. The feathers tend to ball up and float on top of the mud or slurry. Special precautions must be taken to prevent a wad of feathers from fouling the pump used to force the mud or slurry into the well. Proper mixing can be obtained by recirculating the feathers with the mud or slurry through the Halliburton jet mixer of the type disclosed in United States Patent No. 1,486,883. It is advisable to provide an additional jet in the hopper of such a mixer so that the feathers as they leave the mixer and are forced into the mixing tub are thoroughly wetted. If desired, synthetic detergents or wetting agents may be added to the water used in mixing to aid in wetting the feathers as they are mixed.

While only two examples of the invention have been described herein, it is obvious that the feathers may be prepared in various ways and used in various proportions with many kinds of drilling muds or cement slurries without departing from the spirit of the invention or the scope of the annexed claims.

I claim:

1. A composition of matter for use in drilling oil wells or the like comprising drilling mud containing comminuted feathers in a quantity of 0.25 per cent by weight or more, the amount being sufficient to retard the flow of the mud into crevices or fissures in earth structures.

2. A composition of matter for use in drilling oil wells or the like comprising drilling mud containing 0.25 to 1.00 per cent by weight of comminuted feathers.

FRANCIS M. ANDERSON.